Figure 1A:
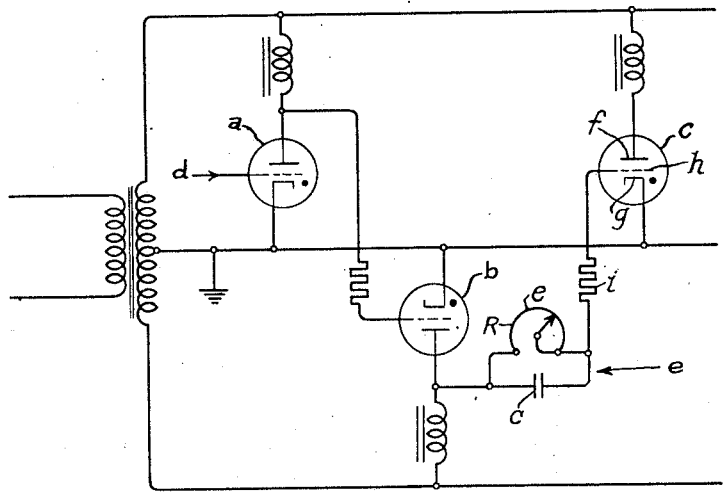

Oct. 14, 1952 — M. E. BIVENS — 2,614,240

ELECTRIC SEQUENCE AND TIMING CIRCUITS

Filed Nov. 15, 1949 — 4 Sheets-Sheet 1

Inventor:
Maurice E. Bivens,
by Claude H. Mott
His Attorney.

Oct. 14, 1952     M. E. BIVENS     2,614,240
ELECTRIC SEQUENCE AND TIMING CIRCUITS
Filed Nov. 15, 1949     4 Sheets-Sheet 2
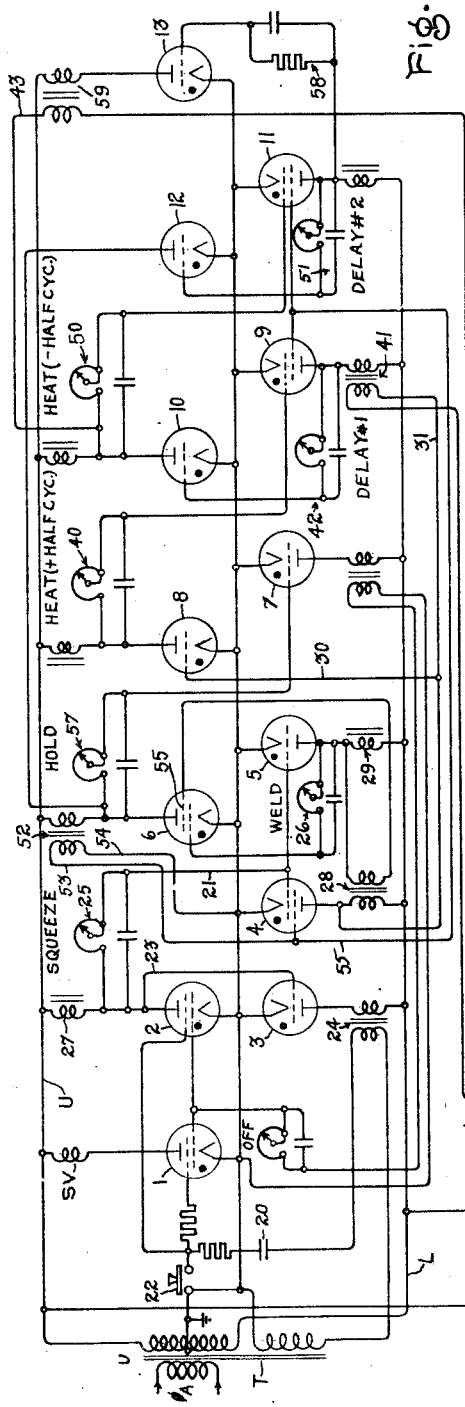
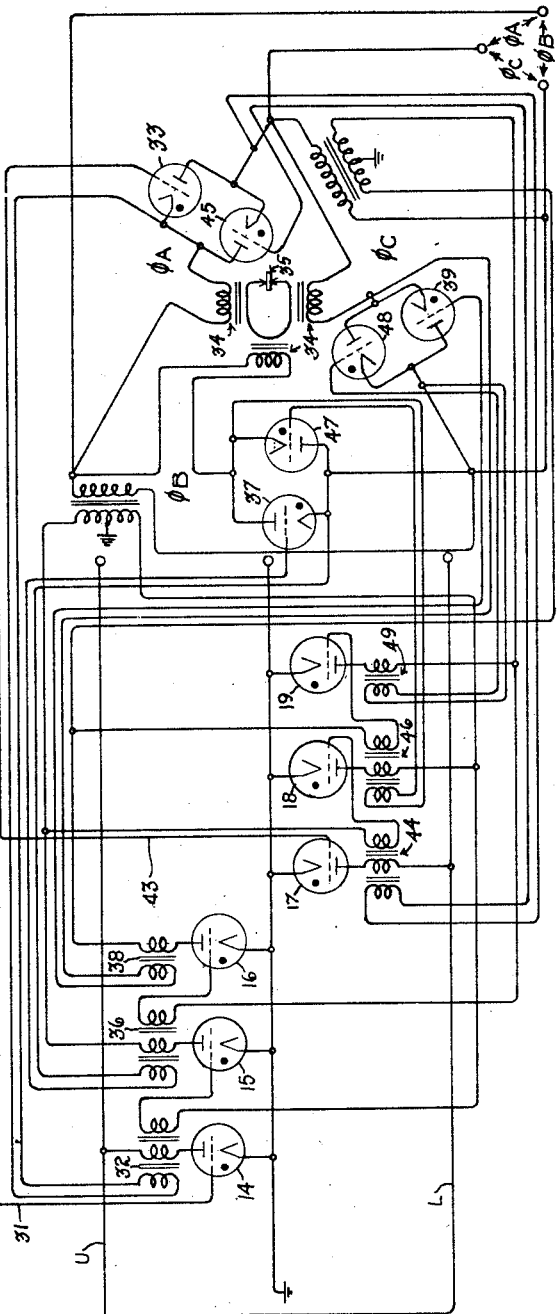
Fig. 2.
Inventor:
Maurice E. Bivens,
by    *Charles H. Noll*
His Attorney.

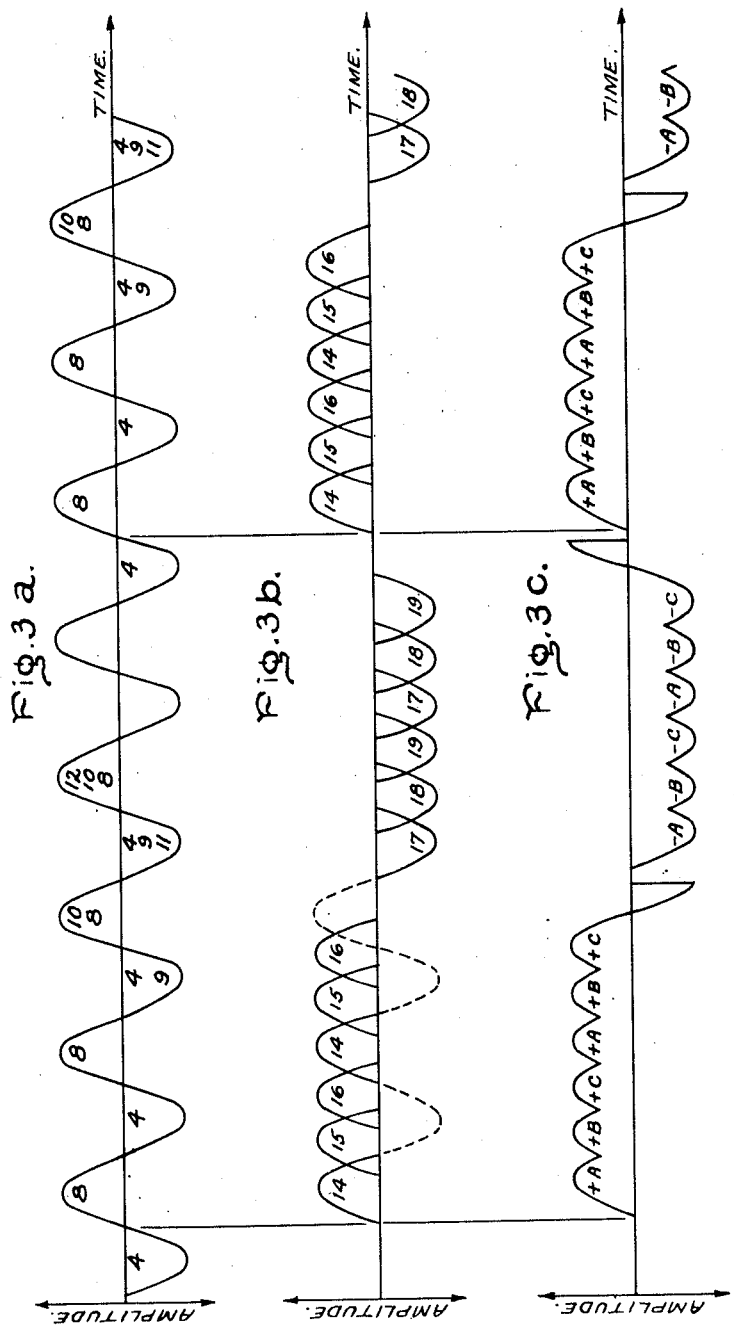

Patented Oct. 14, 1952

2,614,240

UNITED STATES PATENT OFFICE 2,614,240

ELECTRIC SEQUENCE AND TIMING CIRCUITS

Maurice E. Bivens, Schenectady, N. Y., assignor to General Electric Company, a corporation of New York Application November 15, 1949, Serial No. 127,374

20 Claims. (Cl. 321—7)

1

My invention relates to electrical control and timing circuits and more particularly to improved circuits for effecting the timed transfer of energy from an alternating current supply circuit of one frequency to a load circuit operating at another frequency by means of controlled electron discharge devices.

The problem of energizing a load circuit with waves of a frequency different from the frequency of the alternating waves normally available from a power source in order to achieve optimum operation of the load circuit is often encountered in the electrical power transmission field, and is of special importance in the electrical welding art. The use of electron discharge devices for transferring energy from a polyphase alternating current supply to a single phase alternating current load circuit at a reduced frequency has been widely adopted in resistance welding applications. The secondary circuit of a welding transformer is of necessity a low voltage high current loop. The reactance of this loop circuit is proportional to the power supply frequency. As a result, the large wattless component of power present when the normal 60 cycle power is being used, is reduced by operating at a lower frequency. In addition, better regulation and a reduced demand current per line and consequently improved voltage regulation is obtained by distributing the single phase welder load on all phases of the polyphase power supply. In order to effect periodic energization of the load at the lower frequency in a satisfactory manner, careful synchronization of the periods of energization and deenergization of the load with the low frequency voltage is required in order to minimize transient and saturation effects in the magnetic circuits.

It is an object of my invention to provide an improved electric control circuit.

It is another object of my invention to provide an improved electric control circuit for effecting periodic energization of a load circuit with alternating current of one frequency from an alternating current supply source of another frequency.

It is a further object of my invention to provide an electronic arrangement for effecting improved sequencing and timing of the operations encountered in an electric welding system.

In accordance with a preferred embodiment of my invention, a single phase load circuit is connected with a polyphase alternating current source by an electric valve frequency changer including two groups of electric discharge valves connected to supply half waves of voltage of opposite polarity to the load circuit. Current of one polarity is supplied to the load circuit through the valves of one group conducting in succession, and current of the opposite polarity is supplied through the valves of the other group conducting in succession. The transfer of current from one group of valves to the other is controlled by in improved electronic circuit which determines the frequency of operation of the frequency changer. The frequency established by the control circuit may readily be adjusted and is synchronized with the alternating current supply source to maintain a desired low frequency wave shape.

The operation of the frequency determining circuit is modified by electronic timing circuits which are utilized to determine the periods at which the frequency changer is operative and inoperative to transfer energy to the load circuit. These electronic circuits synchronize the low frequency circuits with the power supply frequency. Means for delaying a transfer of current from one group of valves of the electric valve frequency changer to the other beyond the time established by the frequency determining circuit are provided to achieve proper commutation.

Figure 1B:
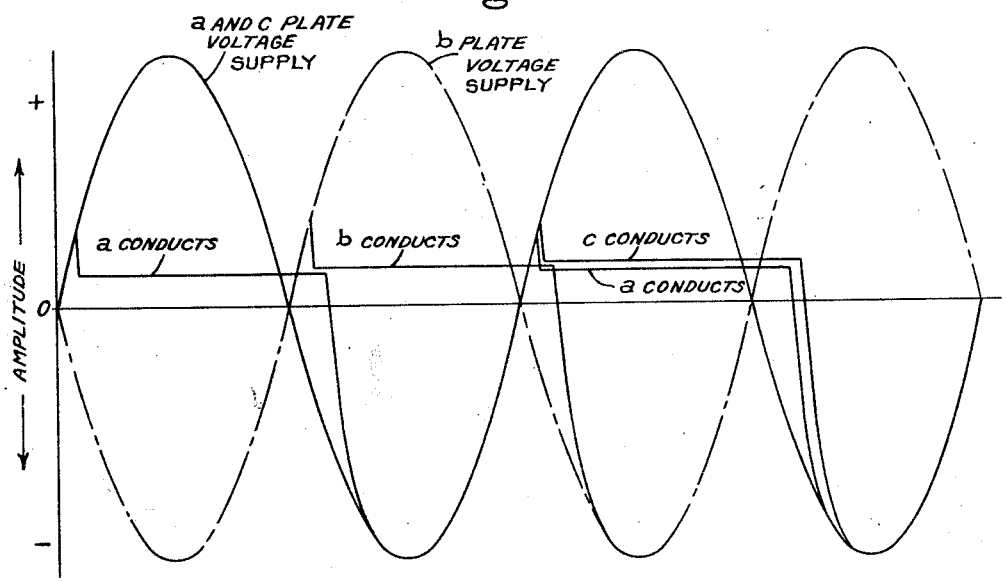
Figure 4A:
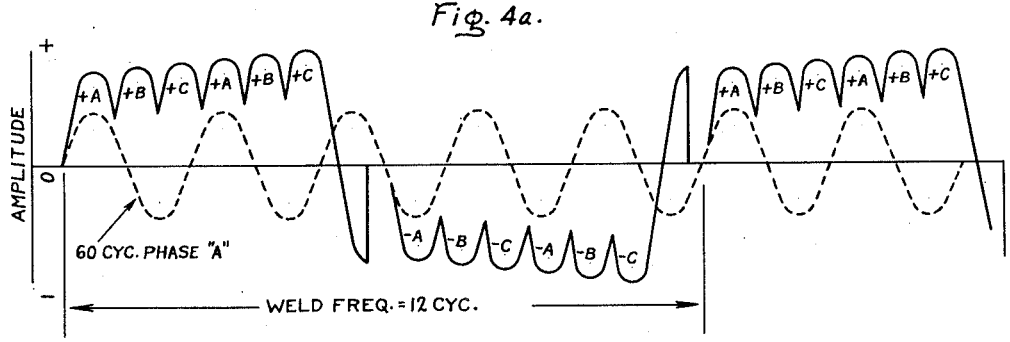
Figure 4B:
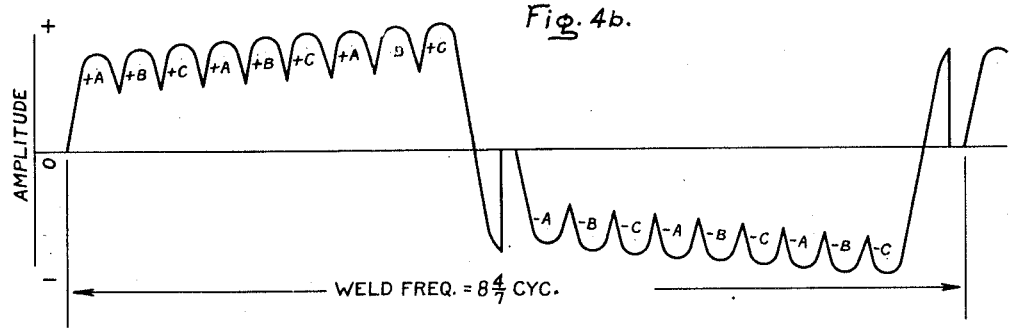
Figure 4C:
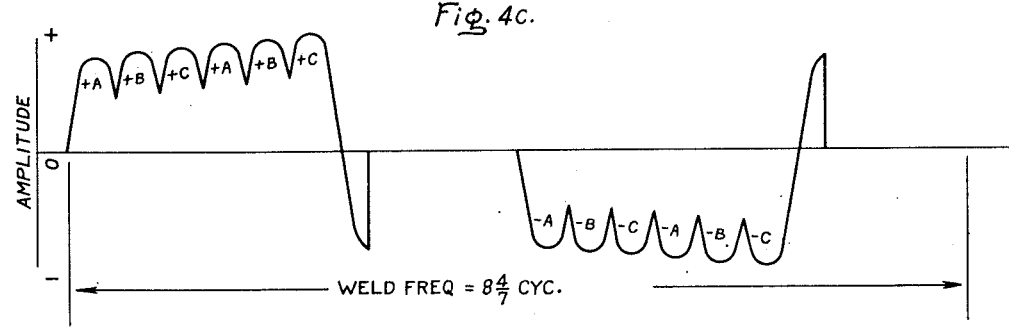

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing wherein Figs. 1a and 1b illustrate the circuit and wave shapes employed in a "trailing tube" circuit to achieve successive firing of gaseous discharge devices employed in the inventive circuit. Fig. 2 is a circuit diagram illustrating a preferred arrangement for carrying out the invention. Figs. 3a, 3b and 3c are graphs illustrating the sequential operation of the various tubes employed in Fig. 2 and the resulting wave shapes produced. Figs. 4a, 4b and 4c illustrate various wave shapes obtainable with the arrangement of Fig. 2.

The sequence of operation of the various components of the welding control circuit shown in Fig. 2 is based on a trailing tube circuit arrangement. This circuit arrangement consists of two or more thyraton tubes so connected that the firing of any but the leading tube depends on the trailing or lagging action of the preceding tube. The trailing action of the leading tube is obtained by inserting an inductive load in its plate circuit. This reactive load causes the leading tube to fire over into the negative half cycle of the plate voltage supply wave. These series of events are provided by the circuit arrangement of Fig. 1a where gaseous discharge devices a and c have their gaseous discharge paths energized with voltage of one polarity derived from a single phase source, phase A, by means of a center tapped transformer and tube b has its gaseous discharge path energized with voltage of the opposite polarity, also derived from the single phase source. Tube a is normally held non-conductive by means of a bias voltage applied at d, whereas tubes b and c have their input circuits coupled to the inductive plate loads of tubes a and b respectively, thereby being held non-conductive when the tubes associated with these plate loads are non-conductive. As soon as tube a fires upon removal of cut-off bias at d, the events of Figure 1b are precipitated, with the inductive loads carrying firing current into the opposite polarity cycle of plate voltage. Thus tubes b and c are fired during their respective cycles of positive plate voltage subsequent to firing of tube a. To control the firing time of tube c with respect to the firing time of tube b, a time constant delay circuit e may be provided. This delay circuit may have a time constant sufficient to extend over several firings of tube b before permitting the firing of tube c.

The tubes of Fig. 1a, and Fig. 2 about to be described, are electron discharge devices having a plate or anode a, a cathode g and a control element or grid h. In the particular arrangement illustrated, the elements of each tube are enclosed in an envelope containing an ionizable gas or vapor as indicated by the dot within the circle employed for representing the envelope. The control element of each tube is connected with its cathode by means of a control element circuit and conduction or non-conduction of the tube depends on the voltage values introduced in these control element circuits. In some instances in Fig. 2 a tube will have two control elements which are connected in independent control element circuits to secure the desired control. The time constant delay circuit e of Fig. 1a, which is also employed in several places in Fig. 2, comprises a parallel connected capacitor C and adjustable discharge resistor R, which as a unit is connected in the control element circuit of the tube it controls. Thus, the control element circuit of tube c of Fig. 1a extends from its grid or control element h through a current limiting resistor i, the timing circuit RC and the anode-cathode circuit of tube b when this tube is conducting. When tube b is non-conducting grid h is connected to the anode voltage of tube b which is 180° out of phase with the anode voltage of tube c and thus holds tube c non-conducting if there is no charge on capacitor C. This capacitor is charged during positive half cycles of anode voltage of tube b when this tube is non-conducting, by grid rectification of tube c so that when tube b does conduct, tube c will not follow immediately but is delayed until the charge on capacitor C can be dissipated through the adjustable resistor R. The charge on capacitor C must decrease to a value less than the anode-cathode drop of tube b within the first few degrees of the positive anode voltage of tube c or else this tube will not conduct because the drop across tube b exists for only a few degrees due to the continuance of current flow over into the next half cycle as a result of the inductive load in the anode-cathode circuit of tube b as shown in Fig. 1b.

Referring to Fig. 2, there is illustrated a preferred circuit arrangement in accordance with applicant's invention, wherein the sequence and weld frequency timing circuits illustrated therein operate from one phase, namely phase A, of a three phase supply. Thus the control circuits operate as a single phase control and employ trailing tubes to effect firing of phases B and C. The operation disclosed is all electronic and synchronous.

The controls of Fig. 2 are set at a weld frequency of 12 cycles while employing a 60 cycle three phase power supply having phases A, B and C. This weld frequency is achieved by the use of two groups of electron discharge coupling devices alternately energized for supplying half waves of 60 cycle per second voltage of opposite polarity to the single phase load as shown in Fig. 3c. The coupling devices of each group are sequentially fired by a respective gaseous discharge trigger device. The trigger devices are also arranged into two groups corresponding to the two groups of coupling devices, and the trigger devices of each group are fired under the control of a common source of trigger signals. The trigger signals are supplied to the lead device of each trigger group over separate paths. One of said paths, comprises two series of gaseous discharge delay devices energized with a respective polarity of A phase voltage in accordance with the arrangement of Fig. 1a for delaying the firing of the lead device of one trigger group with respect to the lead device of the other trigger group to insure the application of successive phases of the power source of one polarity and then the opposite polarity to the load circuit.

The lead device of the leading trigger group is arranged to be cut-off in response to conduction of a device in said delay device series, and the lead device of the trailing trigger group is arranged to be cut off in response to conduction of the final device in an additional series of delay devices. Thus, cutting off the lead trigger device in each group terminates the contribution of the respective coupling group to the load circuit. To terminate the weld cycle, the trigger signals employed to fire the lead device of each trigger group over a respective path are removed with the aid of two series of gaseous discharge control devices energized with a respective polarity from one phase of said multiphase power source. These series of control devices constitute a delayed cut-off feedback circuit for the trigger signal source. Arrangements are also made to delay coupling one polarity of the respective phases after coupling the other polarity to avoid commutation faults.

Furthermore, to insure a complete welding cycle, one of the control devices of said series is responsive to one of said additional delay devices to block removal of said trigger signal source until a weld cycle is completed.

Under the above arrangement, the sequence of trailing tube operation is as indicated in Fig. 3a wherein the firing of the various tubes is indicated with respect to the 60 cycle wave shape available at phase A. Fig. 3b further illustrates the coupling in succession of positive and negative going half cycles of the various phases with a ⅓ cycle delay between half cycles which corresponds to a one full cycle delay between the last coupling of the positive A phase and the first coupling of the negative A phase. This allows the phases B and C to be coupled before an A phase coupling of opposite polarity is achieved. Fig. 3c illustrates the low frequency welding voltage wave applied to the load circuit.

In detail, the arrangement of Fig. 2 comprises gaseous discharge tubes 1, 2, 6, 8, 10, and 12—16 having their discharge paths coupled between the upper terminal U of a transformer T whose primary winding is connected across phase A and the center tap or ground, of this transformer, while tubes 3, 4, 5, 7, 9, 11 and 17—19 are coupled between the lower terminal L of transformer T and the grounded center tap thereof. Thus the tubes connected to the upper terminal U of phase A are capable of being fired with a 180° phase displacement with respect to the tubes coupled to the lower terminal L of phase A, thereby insuring synchronous operation. Tube 1 is normally non-conductive due to the negative bias voltage developed across condenser 20 caused by grid current flow during positive half cycles of grid supply voltage energization of tube 1 by T. Tube 2 is also normally cut off for the same reason.

Tubes 4 and 5, which control the sequence and timing functions of the circuit arrangement, are also normally held off by the negative bias voltage of the capacitor of timing circuit 25 or, if this timing circuit is set for zero, by the 180° phase difference existing between the plate voltage of these tubes and the grid voltage available over lead 21 which is normally at the potential of terminal U because of the nonconductance of tube 2. By closing switch 22, the negative bias developed across 20 is shorted out thereby causing conduction of tubes 1 and 2 during positive excursions of their plate voltages. Conduction of tube 1 energizes the solenoid valve, SV, controlling closure of the welder electrodes. Conduction of tube 2, which comprises the source of trigger signals initiating a weld cycle, provides a voltage on lead 21 which carries over in time into the positive half cycle of tubes 4 and 5 anode supply voltage, thereby permitting tubes 4 and 5 to fire. It should be noted that tube 4 directly controls firing of the lead device of one trigger group comprising 14, 15, 16, and the lead device of the series of delay devices comprising 8, 9, 10. Devices 8, 9, and 10, in turn, control the firing of the other trigger group comprising 17, 18 and 19. Tube 5 comprises the lead device of the control series previously mentioned. Tube 5 may be identified as the start tube and tube 6 as the stop tube since they respectively start and stop the weld time. Tube 3 which was normally cut off because of voltage available from terminal U over lead 23 is also made conductive upon conduction of tube 2, thereby energizing transformer 24, providing positive bias to the input circuits of tubes 1 and 2, and hence maintaining tubes 1 and 2 in firing position irrespective of whether switch 22 is held closed or not. The energization of tubes 4 and 5 may be controlled by the squeeze control circuit 25 which comprises a time constant circuit delaying the trigger signal due to conduction of tube 2 before application to tubes 4 and 5.

Thus tubes 4 and 5 operate at the end of the squeeze time established by 25. The discharge of tube 5 initiates the weld time applied to the input of tube 6 over the time delay circuit 26. It should be noted that tubes 2, 4 and 5 employ the plate load inductances 27, 28 and 29 for providing the trailing action previously mentioned with respect to Fig. 1. Tube 4 is arranged to prevent tube 6 from trailing tube 5 in case the weld time expires during the weld frequency cycle as will be described later. Tubes 8 and 14 trail tube 4 because of leads 30 and 31 between the plate electrode of tube 4 and the input circuits of these tubes. Referring to Fig. 3a it is noted that an inherent delay of one cycle exists between the firing of tubes 4 and 9. The firing of tube 14 establishes a voltage across transformer 32 which fires the positive A phase associated with power tube 33 thereby coupling a positive 60 cycle pulse of power by means of welding transformer 34 to the welding or load circuit 35. The energization of transformer 32 in the output circuit of tube 14 also fires tube 15 when its plate voltage goes positive, which in turn fires the positive B phase by means of transformer 36 associated with power tube 37 thereby applying a positive pulse of B phase voltage to the welding circuit 35. In a similar manner, the energization of transformer 36 also fires tube 16 which in turn fires the positive C phase by means of transformer 38 associated with power tube 39 thereby applying a positive pulse of C phase voltage to the welding circuit.

At this point in the description it should be noted that tubes 6 to 13 inclusive are provided with plate load inductances as shown to provide trailing action of these tubes. As already pointed out above, the same is true for tubes 2, 4 and 5 where the respective inductances have been identified by reference numbers 27, 28 and 29.

The firing of tube 8 which commenced upon firing of the tube 4 because of connection 30 provides a trigger voltage which is delayed by means of the positive cycle heat control circuit 40 to fire tube 9. For the arrangement shown in Fig. 3a, heat control timing circuit 40 is adjusted to provide a one cycle delay thereby establishing a one cycle delay between the firing of tubes 4 and 9 and another cycle between the firing of tubes 8 and 9. This permits two conducting half cycles of tube 14 before the trailing of tube 14 is stopped by tube 9 and its neutralizing transformer 41. Although transformer coupling has been employed, other methods can be resorted to for insuring that tube 15 trails tube 14, and tube 16 trails tube 15, each of which turn on their respective power tubes 33, 37 and 39 to produce the positive half cycles shown in Fig. 3b.

Tube 10 is normally arranged to trail tube 9 without a time delay by means of the delay circuit 42 coupling the plate electrode of tube 9 to the input circuit of tube 10. The functioning of circuit 42 will be described later. The firing of tube 10 substantially grounds lead 43 coupled to the input circuit of tube 17, and hence causes conduction thereof in response to the plate circuit voltage drop of tube 10. The conduction of tube 17 applies a trigger signal over transformer 44 to the fire power tube 45 thereby coupling the negative half cycle of phase A over welding transformer 34 to the load circuit 35. The firing of tube 17 also triggers tube 18 by means of transformer 44, thereby coupling a trigger voltage over transformer 46 to the input of power tube 47 resulting in a negative half cycle of phase B voltage being applied to the load circuit 35. Tube 19 is triggered by the voltage developed across transformer 46 which causes operation of power tube 48 by means of the signal developed across transformer 49. Tube 48 thereby couples a negative half phase of phase C voltage to the load circuit 35. Thus it is seen that tubes 17, 18 and 19 are fired successively once tube 10 has been triggered to conduct.

Tube 11 trails tube 10 after a delay controlled by negative cycle heat control circuit 50. Thus there is an inherent delay of one cycle between tubes 9 and 11 or between 9 and 17. This is essentially the 1/3 cycle delay between the positive C phase and the negative A phase energization of the load circuit. Tube 12 trails tube 11 after an adjustable delay established by delay circuit 51 whose functioning will be described later, and by energizing the neutralizing transformer 52 of tube 6 prevents tubes 4, 9 and 11 from trailing their respective leading tubes because of leads 53—55; consequently tubes 8, 10 and 12 also stop conducting. Tubes 4, 8, 9, 10, 11, 12 and 13 by reason of their sequential operation may be identified as sequencing electron discharge devices and tubes 14 and 17 of the trigger groups as control circuit electron discharge devices and are so referred to in some of the appended claims.

Referring to Fig. 3a, it is noted that tube 10 conducted during two successive half cycles before being stopped by tube 12 stopping tube 9. Therefore, tube 17 trailed tube 10 for two successive half cycles.

When tube 12 stops tubes 4, 9 and 11 from firing, which in turn stops tubes 8, 10 and 12, the neutralizing voltage available over transformer 28 and applied to the shield grid 55 of the weld time tube 6 is absent. This allows tube 6 to function in accordance with the weld time delay circuit 26. If the weld time elapsed during the last low frequency cycle, tube 6 responds and energizes transformer 52 which locks out tube 4, 9, 11 and hence also tubes 8, 10, 12, 13, 14, 17, etc. and initiates the hold time by means of circuit 57. After the hold time elapses, tube 7 becomes conductive and applies through its transformer and grid circuit of tubes 1 and 2, a negative hold-off voltage across the capacitor in the off timing circuit which prevents initiation of conduction in tubes 1 and 2 until this hold-off voltage dissipates itself in the adjustable resistance connected across this capacitor. If tube 6 does not respond, tube 4 will reinitiate another low frequency weld cycle with one full cycle delay on phase A. Then the operation of tube 6 is blocked by tube 4 during this next low frequency. Thus it is seen that the welding current it always composed of an even number of half cycles or full cycles.

Conduction of tube 13 energizes it neutralizing transformer 59 thereby applying a voltage in the input circuit 43 which prevents conduction of tube 17 in trailing response to conduction of tube 10. Tube 13 is employed to limit the duration of the negative half cycle when the delay between positive negative going weld currents exceeds 1/3 cycle. A one cycle time delay is produced between the plate electrode of tube 11 and the input of tube 13 by means of circuit 58 to prevent tube 13 from operating when it would interfere with the desired welding pattern and allows it to operate when required.

A 12 cycle weld frequency with 1/3 cycle delay is derived from direct sequencing or trailing and neutralizing actions among the tubes except that an RC time delay of one cycle is required between tubes 8 and 9. This is provided by the heat half cycle delay circuit 40.

To provide control of commutation between positive and negative going low frequency half cycles and hence avoid commutation faults, delay circuits 42 and 51 are provided, which extend the normal 1/3 cycle delay provided by the arrangement disclosed.

Although the arrangement of Fig. 2 has been described as providing a 12 cycle per second welding current to the load circuit, the arrangement lends itself readily to other weld frequencies. Referring to Fig. 3, it is noted that the low weld frequency is obtained by having the group of coupling devices 33, 37, 39 conduct to form the desired positive weld-frequency half cycle, and then having the group of coupling devices 45, 47 and 48 conduct for the same length of time to form the negative weld-frequency half cycle. By adjusting the Heat (+half cyc.) and Heat (—half cyc.) controls, different weld frequencies may be obtained as shown in Figs. 4a and b. The welding-current frequency may also be altered by changing the basic delay between half cycles as shown in Fig. 4c.

While the illustrated embodiment of applicant's invention has been directed to the transfer of energy from a three phase supply to a single phase load circuit employing frequency conversion, applicant's invention is also applicable to other types of phasing arrangements, wherein an all electronic arrangement is required.

While I have shown only certain preferred embodiment of my invention by way of illustration, many modification will occur to those skilled in the art and I therefore wish to have it understood that I intend, in the appended claims, to cover all such modifications as fall within the true spirit and scope of my invention.

What I claim as new and desire to secure by Letters Patent of the United States is:

1. In an arrangement comprising a plurality of groups of electron discharge coupling devices sequentially operated to couple half waves of voltage of opposite polarity to a single phase load from a multiphase alternating signal source wherein a signal of one polarity is coupled to the load by the coupling devices, each associated with a respective phase of said source, of given groups operating in succession, and a signal of the opposite polarity is coupled by the coupling devices, each associated with a respective phase of said source, of the remaining groups operating succession, means synchronized with and energized solely by the voltage of one phase of said source for sequentially operating each of the devices of said given groups a plural integral number of times for controlling the period of voltage of one polarity coupled to said load, means synchronized with and energized solely by the voltage of said one phase of said source for sequentially operating each of the devices of said remaining groups a plural integral number of times for controlling the period of voltage of opposite polarity coupled to said load, and means synchronized with and energized solely by the voltage of said one phase of said source for controlling the time of transfer of voltage coupled by said given groups of devices and said remaining groups of devices.

2. In an arrangement comprising two groups of three gaseous discharge coupling devices alternately connected to supply half waves of voltage of opposite polarity to a single phase load from a three phase alternating voltage source wherein voltage of one polarity is supplied to the load through the coupling devices, each associated with a respective phase of said source, of one group conducting in succession, and voltage of the opposite polarity is supplied through the coupling devices, each associated with a respective phase of said source, of the other group conducting in succession, means synchronized with the voltage of one phase of said source for controlling the period of voltage of one polarity supplied to said load, means synchronized with the voltage of said one phase for controlling the period of voltage of the other polarity supplied to said load, and means synchronized with the voltage of said one phase of said source for adjustably delaying the transfer of voltage supplied from one group of devices to the other.

3. In an arrangement comprising two groups of electron discharge coupling devices alternately operated to supply half waves of voltage of opposite polarity to a single phase load from a multiphase alternating voltage source wherein voltage of one polarity is supplied to the load through the coupling devices, each associated with a respective phase of said source, of one group conducting in succession, and voltage of the opposite polarity is supplied through the coupling devices, each associated with a respective phase of said source, of the other group conducting in succession, means synchronized with and energized solely by the voltage of one phase of said source for successively operating the devices of one group a plural integral number of times thereby controlling the period of voltage of one polarity supplied to said load, and means synchronized with and energized solely by the voltage of said one phase for successively operating the devices of the other group a plural integral number of times thereby controlling the period of voltage of the other polarity supplied to said load.

4. In an arrangement comprising two groups of three electron discharge coupling devices alternately coupled to supply half waves of voltage of opposite polarity to a single phase load from a three phase alternating voltage source wherein voltage of one polarity is supplied to the load through the coupling devices, each associated with a respective phase of said source, of one group conducting in succession, and voltage of the opposite polarity is supplied through the coupling devices, each associated with a respective phase of said source, of the other group conducting in succession, a respective gaseous discharge trigger device associated with each coupling device, said gaseous discharge trigger devices having input and output circuits and forming two groups corresponding to said coupling groups, each coupling device of a group responsive to the output of a respective one of said trigger devices for supplying voltage to said load, means for energizing the gaseous discharge path and input circuit of each trigger device with voltage of a phase corresponding to the associated phase of an associated coupling device for normally maintaining said trigger devices non-conductive, and means for triggering the lead device of each trigger group to conduct, each of the trailing devices of a respective trigger group being responsive to conduction of a leading device in said group to become conductive, whereby said coupling devices successively supply voltage to said load, and said means for triggering comprises a common trigger source, said lead device of one trigger group responsive to said trigger source to conduct, two series of gaseous discharge delay devices each having input and output circuits, means deriving two oppositely poled voltages from one phase of said three phase source, means energizing the gaseous discharge paths of each series of devices with a respective one of said two voltages, the lead device of said delay series normally non-conductive and responsive to said trigger source to become conductive, means normally biasing the remaining delay devices in each series to non-conduction with a respective other voltage, each of said delay devices comprising an inductive load circuit and each of the trailing delay devices of one series being responsive to previous conduction of a delay device in the other series due to said inductive load circuit to become conductive whereby alternately successive delay devices in each series are rendered conductive, and means responsive to the output of the finally conductive delay device of said series for causing conduction of the lead device of the other trigger group.

5. In an arrangement comprising two groups of normally non-conducting electron discharge devices sequentially rendered conductive to supply half waves of voltage of opposite polarity to a single phase load from a three phase alternating voltage source wherein voltage of one polarity is supplied to the load through three coupling devices, each associated with a respective phase of said source, of one group conducting in succession, and voltage of the opposite polarity is supplied through three coupling devices, each associated with a respective phase of said source, of the other group conducting in succession, a normally non-conductive respective gaseous discharge trigger device associated with each coupling device, said gaseous discharge trigger devices forming two groups corresponding to said coupling groups and each having input and output circuits, each of said coupling devices responsive to conduction of a respective one of said trigger devices in a respective group to become conductive for supplying voltage to said load, means for energizing the gaseous discharge path and input circuit of each trigger device with voltage of phase corresponding to the associated phase of an associated coupling device for normally maintaining said trigger devices non-conductive, trigger means synchronized with the voltage of one phase of said source for triggering the lead device of each trigger group to conduct, each of the trailing devices of a respective trigger group responsive to conduction of a leading trigger device in its respective group to become conductive, whereby said coupling devices successively supply voltage to said load, said trigger means comprises a common trigger source, said lead device of one trigger group responsive to said trigger source to become conductive, two series of gaseous discharge delay devices, means deriving two oppositely poled voltages from one phase of said three phase source, means energizing the gaseous discharge paths of each series of devices with a respective one of said two voltages, the lead device of said delay series normally non-conductive and responsive to said trigger source to become conductive, means normally biasing the remaining delay devices in each series to non-conduction with a respective other voltage, each of said delay devices comprising an inductive load circuit and each of the trailing delay devices of one series being responsive to conduction of a leading delay device in the other series to conduct whereby alternately successive delay devices in each series are rendered conductive, and means responsive to the output of the finally conductive delay device of said two series for causing conduction of the lead device of the other trigger group.

6. An arrangement according to claim 5 further comprising said lead trigger device of said one group responsive to conduction of one of said delay devices to become non-conductive, thereby initiating a halt to the supply of voltage by its associated coupling group.

7. An arrangement according to claim 5 further comprising an additional two series of gaseous discharge delay devices, means energizing the gaseous discharge paths of each additional series of devices with a respective one of said two voltages, the lead device of said additional delay series normally non-conductive and responsive to conduction of said finally conductive first named delay device to become conductive, means normally biasing the remaining delay devices in each additional series to non-conduction with the other of said two voltages, each of said additional delay devices comprising an inductive load circuit and each of the trailing additional delay devices of one series being responsive to previous conduction of a delay device in the other additional series due to said load circuit to become conductive whereby alternately, successive additional delay devices in each series are rendered conductive, said lead device of said other trigger group responsive to conduction of the finally conductive additional delay device of said series to become non-conductive thereby initiating a halt to the supply of voltage by its associated coupling group.

8. An arrangement according to claim 5 further comprising two series of control gaseous discharge devices, means energizing the gaseous discharge paths of each series of control devices with a respective one of said two voltages, the lead device of said control series normally non-conductive and responsive to said trigger source to become conductive, means normally biasing the remaining devices in each control series to non-conduction with the other of said two voltages, each of the trailing control devices of one series responsive to previous conduction of a control device in the other control series to become conductive whereby alternately, successive control devices in each series are rendered conductive, and means responsive to conduction of the finally conductive control device of said series for decoupling said trigger source from said arrangement.

9. An arrangement according to claim 8 further comprising one of said control devices responsive to conduction of one of said additional delay devices to block decoupling said trigger source from said arrangement.

10. An arrangement according to claim 9 further comprising an additional two series of gaseous discharge delay devices, means energizing the gaseous discharge paths of each additional series of device with a respective one of said two voltages, the lead device of said additional delay series normally inoperative and responsive to operation of said finally operative first named delay device to become operative, means normally biasing the remaining delay devices in each additional series to inoperativeness with the other of said two voltages, each of the trailing additional delay devices of one series responsive to previous operation of a delay device in the other additional series to become operative, whereby alternately successive additional delay devices in each series are rendered operative, said lead device of said other trigger group responsive to operation of the finally operative additional delay device of said series to become inoperative thereby initiating a halt to the application of voltage by its associated coupling group.

11. In an arrangement comprising two groups of normally inoperative electron discharge devices sequentially rendered operative to apply half waves of voltage of opposite polarity to a single phase load from a three phase alternating voltage source wherein voltage of one polarity is applied to the load by the coupling devices, each associated with a respective phase of said source, of one group operating in succession, and voltage of the opposite polarity is applied by the coupling devices, each associated with a respective phase of said source, of the other group operating in succession, a normally inoperative respective gaseous discharge trigger device associated with each coupling device, said gaseous discharge trigger devices forming two groups corresponding to said coupling groups and each having input and output circuits, each of said coupling devices responsive to operation of a respective one of said trigger devices in a respective group to become operative to apply voltage to said load, means for energizing the gaseous discharge path and input circuit of each trigger device with voltage of phase corresponding to the associated phase of an associated coupling device for normally maintaining said trigger devices inoperative, trigger means synchronized with the voltage of one phase of said source for triggering the lead device of each trigger group to operate, each of the trailing devices of a respective trigger group responsive to operation of a leading trigger device in its respective group to become operative whereby said coupling devices succesively supply voltage to said load, said trigger means comprises a common trigger source, said lead device of one trigger group responsive to said trigger source to become operative, two series of gaseous discharge delay devices, means deriving two oppositely poled voltages from one phase of said three phase source, means energizing the gaseous discharge paths of each series of devices with a respective one of said two voltages, the lead device of said delay series normally inoperative and responsive to said trigger source to become operative, means normally biasing the remaining delay devices in each series to inoperativeness with a respective other voltage, each of the trailing delay devices of one series responsive to operation of a leading delay device in the other series to become operative whereby alternately successive delay devices in each series are rendered operative, and means responsive to the output of the finally operative delay device of said two series for causing operation of the lead tube of the other trigger group.

12. An arrangement according to claim 11 further comprising said lead trigger device of said one group responsive to operation of one of said delay devices to become operative, thereby initiating a halt to the application of voltage by its associated coupling group.

13. A frequency reducer for three phase alternating voltage of a given frequency from a given source comprising first normally inoperative means for repeatedly successively selecting substantially a half cycle of voltage of one polarity from each phase of said source, second normally inoperative means for repeatedly successively selecting substantially a half cycle of voltage of the opposite polarity from each phase of said source, means for alternately operating said first and second means, and adjustable time delay means operated by said last mentioned means, means for controlling the time interval between operation of said first and second means.

14. An arrangement according to claim 13 wherein said first, second and said adjustable means are each timed with one phase of said source.

15. Apparatus comprising first and second control circuit devices, first and second control circuit electron discharge devices, and a group of six electron discharge devices arranged to become conducting in consecutive order one after the other and identified respectively in accordance with their sequential order of operation as first, second, third, fourth, fifth, and sixth sequencing electron discharge devices, said control circuit electron discharge devices and said second, fourth and sixth sequencing electron discharge devices each having an anode, a cathode, and a control element, and said first, third, and fifth sequencing electron discharge devices each having an anode, a cathode, and two control elements, a direct connection between said cathodes of said electron discharge devices, an inductive circuit for each of said sequencing electron discharge devices, means for supplying alternating voltage to the anode-cathode circuits of said sequencing electron discharge devices through a different one of said inductive circuits, and to said first and second control circuit electron discharge devices through said first and second control circuit electron devices respectively, the voltage applied to said anodes of said first control circuit electron discharge device and said second, fourth, and sixth sequencing electron discharge devices being 180 degrees out of phase with the voltage applied to said anodes of said second control circuit electron discharge device and said first, third and fifth sequencing electron discharge devices, means for applying between said cathode and one of said control elements of said first sequencing electrons discharge device a voltage which renders said electron discharge device non-conducting when its anode voltage is positive, means for applying between said cathode and said one of said control elements of said first sequencing electron discharge device a voltage which releases said electron discharge device for conduction subject to the control of its said other control element when its anode voltage is positive, means for connecting said control element of said second sequencing electron discharge device and said control element of said first control circuit electron discharge device to the anode connection of said first sequencing electron discharge device with its said inductive circuit, means including a first timing capacitor for connecting one of said control elements of said third sequencing electron discharge device with the anode connection of said second sequencing electron discharge device with its said inductive circuit, means including a second timing capacitor for connecting said control element of said fourth sequencing electron discharge device to the anode connection of said third sequencing electron discharge device with its said inductive circuit, means including a third timing capacitor for connecting one of said control elements of said fifth sequencing electron discharge device with the anode connection of said fourth sequencing electron discharge device with its said inductive circuit, means including a fourth timing capacitor for connecting said control element of said sixth sequencing electron discharge device with the anode connection of said fifth sequencing electron discharge device with its said inductive circuit, a discharge resistor connected across each of said timing capacitors, means responsive to anode-cathode conduction of said third sequencing electron discharge device for interposing between said control element and cathode of said first control circuit electron discharge device a voltage which renders it non-conductive when its anode voltage is positive during the next half-cycle of the supply voltage following anode-cathode conduction of said third sequencing electron discharge device, means for connecting said control element of said second control circuit electron discharge device with the anode connection of said fourth sequencing electron discharge device with its said inductive circuit, and means responsive to anode-cathode conduction of said sixth sequencing electron discharge device for applying between said cathodes and said other control elements of said first, third, and fifth sequencing electron discharge devices a voltage which renders said electron discharge devices non-conducting when their anode voltages are positive in the next half-cycle of supply voltage following anode-cathode conduction of said sixth sequencing electron discharge device.

16. Apparatus comprising first and second control circuit devices, first and second control circuit electron discharge devices and a group of six electron discharge devices arranged to become conducting in consecutive order one after the other and identified respectively in accordance with their sequential order of operation as first, second, third, fourth, fifth and sixth sequencing electron discharge device, said control circuit electron discharge devices and said second, fourth and sixth sequencing electron discharge devices each having an anode, a cathode, and one control element, and said first, third and fifth sequencing electron discharge devices each having an anode, a cathode, and two control elements, a direct connection between said cathodes of said electron discharge devices, first and second control transformers each having a primary winding and a secondary winding, an inductive circuit for each of said sequencing electron discharge devices, said inductive circuit for said third sequencing electron discharge device including the primary winding of said first control transformer, and said inductive circuit for said sixth sequencing electron discharge device, including the primary winding of said second control transformer, means for supplying alternating voltage to the anode-cathode circuits of said sequencing electron discharge devices through a different one of said inductive circuits and to said first and second control circuit electron discharge devices through said first and second control circuit devices respectively, the voltages applied to said anodes of said first control circuit electron discharge device and said second, fourth and sixth sequencing electron discharge devices being 180 degrees out of phase with the voltages applied to said anodes of said second control circuit electron discharge device and said first, third and fifth sequencing electron discharge devices, means for applying between said cathode and one of said control elements of said first sequencing electron discharge device a voltage which renders said electron discharge device non-conducting when its anode voltage is positive, means for applying between said cathode and said one of said control elements of said first sequencing electron discharge device a voltage which releases said electron discharge device for conduction subject to the control of its said other control element when its anode voltage is positive, means for connecting said control element of said second sequencing electron discharge device to the anode connection of said first sequencing electron discharge device with its said inductive circuit and the control element of said first control circuit electron discharge device through the secondary winding of said first control transformer to the anode connection of said first sequencing electron discharge device with its said inductive circuit, said secondary winding being poled to prevent anode-cathode conduction of said control circuit electron discharge device when its anode is positive in the next half-cycle of supply voltage after anode-cathode conduction of said third sequencing electron discharge device, means including a timing capacitor for connecting one of said control elements of said third sequencing electron discharge device with the anode connection of said second sequencing electron discharge device with its said inductive circuit, means including a second timing capacitor for connecting said control element of said fourth sequencing electron discharge device to the anode connection of said third sequencing electron discharge device with the primary winding of said first control transformer, means including a third timing capacitor for connecting one of said control elements of said fifth sequencing electron discharge device with the anode connection of said fourth sequencing electron discharge device with its said inductive circuit, means including a fourth timing capacitor for connecting said control element of said sixth sequencing electron discharge device with the anode connection of said fifth sequencing electron discharge device with its said inductive circuit, a discharge resistor connected across each of said timing capacitors, and means for connecting said cathodes and said other control elements of said first, third and fifth sequencing electron discharge devices through the primary winding of said second control transformer, said winding being poled to apply voltages to said other control elements of said first, third and fifth sequencing electron discharge devices which prevents anode-cathode conduction thereof when their anode voltages are positive in the next half-cycle of supply voltage after anode-cathode conduction of said sixth sequencing electron discharge device.

17. Apparatus comprising first and second control circuit devices, first and second control circuit electron discharge devices, and first, second, third, fourth, fifth, sixth and seventh sequencing electron discharge devices which operate one after the other in predetermined order, said control circuit electron discharge devices and said second, fourth, sixth and seventh electron discharge devices each having an anode, a cathode, and a control element, and said remaining electron discharge devices each having an anode, a cathode, and two control elements, a direct connection between said cathodes of said electron discharge devices, first, second and third control transformers each having a primary winding and a secondary winding, an inductive circuit for each of said sequencing electron discharge devices, said inductive circuit for said third sequencing electron discharge device including the primary winding of said first control transformer, said inductive circuit for said sixth sequencing electron discharge device including the primary winding of said second control transformer, and said inductive circuit for said seventh sequencing electron discharge device including the primary winding of said third control transformer, means for supplying alternating voltage to the anode-cathode circuits of said sequencing electron discharge devices through a different one of said inductive circuits and to said first and second control circuit electron discharge devices through said first and second control circuit devices respectively, the voltages applied to said anodes of said first control circuit electron discharge device and said second, fourth, sixth and seventh electron discharge device being 180 degrees out of phase with the voltages applied to said anodes of said second control circuit electron discharge device and said first, third and fifth sequencing electron discharge devices, means for applying between said cathode and one of said control elements of said first sequencing electron discharge device a voltage which renders said electron discharge device non-conducting when its anode voltage is positive, means for applying between said cathode and said one of said control elements of said first sequencing electron discharge device a voltage which releases said electron discharge device for conduction subject to the control of its said other control element when its anode voltage is positive, means including a timing capacitor for connecting one of said control elements of said third sequencing electron discharge device with the anode connection of said second sequencing electron discharge device with its said inductive circuit, means including a second timing capacitor for connecting said control element of said fourth sequencing electron discharge device to the anode connection of said third sequencing electron discharge device with the primary winding of said first control transformer, means including a third timing capacitor for connecting one of said control elements of said fifth sequencing electron discharge device with the anode connection of said fourth sequencing electron discharge device with its said inductive circuit, means including a fourth timing capacitor for connecting said control element of said sixth sequencing electron discharge device with the anode connection of said fifth sequencing electron discharge device with its said inductive circuit, means including a fifth timing capacitor for connecting said control element of said seventh sequencing electron discharge device with the anode connection of said fifth sequencing electron discharge device with its said inductive circuit, a discharge resistor connected across each of said timing capacitors, means for connecting said control element of said second sequencing electron discharge device to the anode connection of said first sequencing electron discharge device with its said inductive circuit and said control element of said first control circuit electron discharge device through the secondary winding of said first control transformer to the anode connection of said first sequencing electron discharge device with its said inductive circuit, said secondary winding being poled to prevent anode-cathode conduction of said first control circuit electron discharge device when its anode voltage is positive in the next half-cycle of supply voltage after anode-cathode conduction of said third sequencing electron discharge device, means for connecting said control element of said second control circuit electron discharge device through the secondary winding of said third control transformer to the anode connection of said fourth sequencing electron discharge device with its said inductive circuit, said secondary winding of said third control transformer being poled to prevent anode-cathode conduction of said second control circuit electron discharge device in the next half-cycle of supply voltage after anode-cathode conduction of said seventh sequencing electron discharge device, and means for connecting said cathodes and said other control elements of said first, third and fifth sequencing electron discharge devices through the secondary winding of said second control transformer, said secondary winding being poled to prevent anode-cathode conduction of said first, third and fifth sequencing electron discharge devices when their anode voltages are positive in the next half-cycle of supply voltage after anode-cathode conduction of said sixth sequencing electron discharge device.

18. Apparatus comprising first, second and third electron discharge devices, each having an anode, a cathode, and two control elements, first and second control transformer each having a primary winding and a secondary winding, an inductive circuit for each of said electron discharge devices, said inductive circuit for said first electron discharge device including the primary winding of said first control transformer and said inductive circuit for said third electron discharge device including the primary winding of said second control transformer, a direct connection between said cathodes of said electron discharge devices, means for supplying alternating voltage to the anode-cathode circuits of each of said electron discharge devices through a different one of said inductive circuits, the voltage applied to said anodes of said first and third electron discharge devices being 180 degrees out of phase with the voltage applied to said anode of said second electron discharge device, means for simultaneously applying between said cathode and one of said control elements of said first electron discharge device and between said cathode and said control element of said second electron discharge device a voltage which, subject to the control of its other control element, releases said first electron discharge device for conduction when its anode voltage is positive and which renders said second electron discharge device conducting when its anode voltage is positive, means including a timing capacitor for connecting one of said control elements of said third electron discharge device with the anode connection of said second electron discharge device with its said inductive circuit, a discharge resistor connected across said capacitor, means including the secondary winding of said first control transformer for connecting the other of said control elements of said third electron discharge device with the anode connection of said second electron discharge device with its said inductive circuit, said winding being poled to restrain conduction by said third electron discharge device each time its anode voltage is positive in the next half-cycle of supply voltage after anode-cathode conduction of said first electron discharge device and means including the secondary winding of said second control transformer for connecting the other of said control elements of said first electron discharge device to its said cathode, said winding being poled to prevent conduction of said first electron discharge device when its anode voltage is positive in the next half-cycle of supply voltage after anode-cathode conduction of said third electron discharge device.

19. Apparatus comprising first and second control circuit devices, first and second control circuit electron discharge devices and two groups of electron discharge devices, one of which includes a start electron discharge device and a stop electron discharge device, and the other of which includes first, second, third, fourth, fifth, sixth and seventh sequencing electron discharge devices which operate one after the other in predetermined order, said control circuit electron discharge devices, said start electron discharge device, and said second, fourth, sixth and seventh sequencing electron discharge devices each having an anode, a cathode, and a control element, and said remainder of said electron discharge devices each having an anode, a cathode, and two control elements, a direct connection between said cathodes of said electron discharge devices, first, second, third and fourth control transformers each of which has a primary winding and a secondary winding, four inductive circuits, means for supplying alternating voltage to the anode-cathode circuits of said electron discharge devices, the voltage supplied to said anodes of said start electron discharge device, said second control circuit electron discharge device, and said first, third and fifth sequencing electron discharge devices being 180 degrees out of phase with the voltage supplied to said anodes of said stop electron discharge device, said first control circuit electron discharge device and said second, fourth, sixth and seventh sequencing electron discharge devices, and said anode voltages being supplied to said first and second control circuit electron discharge devices through said first and second control circuit devices respectively, to said start electron discharge device and said second, fourth and fifth sequencing electron discharge devices through different ones of said inductive circuits, to said first sequencing electron discharge device through the primary winding of said first control transformer, to said stop electron discharge device and said sixth sequencing electron discharge device through the primary winding of said second control transformer, to said third sequencing electron discharge device through the primary winding of said third control transformer, and to said seventh sequencing electron discharge device through the primary winding of said fourth control transformer, means including a first timing capacitor for connecting one of said control elements of said stop electron discharge device to the anode connection of said start electron discharge device with its said inductive circuit, means including a second timing capacitor for connecting one of said control elements of said third sequencing electron discharge device with the anode connection of said second sequencing electron discharge device with its said inductive circuit, means including a third timing capacitor for connecting said control element of said fourth sequencing electron discharge device with the anode connection of said third sequencing electron discharge device with the primary winding of said third control transformer, means including a fourth timing capacitor for connecting one of said control elements of said fifth sequencing electron discharge device with the anode connection of said fourth sequencing electron discharge device with its said inductive circuit, means including a fifth timing capacitor for connecting said control element of said sixth sequencing electron discharge device with the anode connection of said fifth sequencing electron discharge device with its said inductive circuit, means including a sixth timing capacitor for connecting said control element of said seventh sequencing electron discharge device with the anode connection of said fifth sequencing electron discharge device with its said inductive circuit, a discharge resistor connected across each of said timing capacitors, means for connecting said control element of said second sequencing electron discharge device to the anode connection of said first sequencing electron discharge device with the primary winding of said first control transformer and the control element of said first control circuit electron discharge device through the secondary winding of said third control transformer to the anode connection of said first sequencing electron discharge device with the primary winding of said first control transformer, said secondary winding of said third control transformer being poled to apply a voltage to the control element of said first control circuit electron discharge device which stops anode-cathode conduction thereof when its anode voltage is positive in the next half-cycle of supply voltage after anode-cathode conduction of said third sequencing electron discharge device, means for connecting said control element of said second control circuit electron discharge device to the anode connection of said fourth sequencing electron discharge device with its said inductive circuit through the secondary winding of said fourth control transformer, said secondary winding being poled to prevent anode-cathode conduction of said second control circuit electron discharge device when its anode is positive in the next half-cycle of supply voltage after anode-cathode conduction of said fourth sequencing electron discharge device, means for connecting the other of said control elements of said stop electron discharge device through the secondary winding of said first control transformer to the anode connection of said start electron discharge device with its said inductive circuit, said secondary winding being poled to prevent anode-cathode conduction of said stop electron discharge device when its anode is positive in the next half-cycle of supply voltage after anode-cathode conduction of said first sequencing electron discharge device, and means for connecting said others of said control elements of said first, third and fifth sequencing electron discharge devices to their said respective cathodes through the secondary winding of said second control transformer, said secondary winding being poled to prevent anode-cathode conduction of these electron discharge devices when their anode voltages are positive in the next half-cycle of supply voltage after anode-cathode conduction of either said stop electron discharge device or said sixth sequencing electron discharge device.

20. Apparatus comprising first, second and third electron discharge devices each having an anode, a cathode and two control elements and a fourth electron discharge device having an anode, a cathode and a control element, first and second control transformers each having a primary winding and a secondary winding, an inductive circuit for each of said first, second, and third electron discharge device, said inductive circuit for said first electron discharge devices including said primary winding of said first control transformer and said inductive circuit for said third electron discharge device including said primary winding of said second control transformer, a direct connection between said cathodes of said electron discharge devices, a direct connection between said anodes of said third and fourth electron discharge devices, means for supplying alternating voltage to the anode-cathode circuits of each of said first, second and third electron discharge devices through a different one of said inductive circuits, the voltage applied to said anodes of said first and third electron discharge devices being 180° out of phase with the voltage applied to said anode of said second electron discharge device, means for simultaneously applying between said cathode and one of said control elements of said first electron discharge device and between said cathode and said control element of said second electron discharge device a voltage which releases, subject to the control of its said other control element, said first electron discharge device for conduction when its anode voltage is positive and which renders said secondary electron discharge device conducting when its anode voltage is positive, means responsive to anode-cathode conduction of said first electron discharge device and effective after a predetermined period of delay for applying between said control element and said cathode of said fourth electron discharge device a voltage which renders said fourth electron discharge device conducting for only a half cycle of its applied anode voltage, means including a timing capacitor for connecting one of said control elements of said third electron discharge device with the anode connection of said second electron discharge device with its said inductive circuit, a discharge resistor connected across said capacitor, means including the said secondary winding of said first control transformer for connecting said other control element of said third electron discharge device with the anode connection of said second electron discharge device with its said inductive circuit, said winding being poled to prevent conduction of said third electron discharge device each time its anode voltage is positive so long as said first electron discharge device is conducting during a preceding half cycle of supply voltage when its anode voltage is positive, and means including said secondary winding of said second control transformer for connecting said cathode and said other control element of said first electron discharge device, said winding being poled to prevent conduction of said first electron discharge device when its anode voltage is positive in the next half-cycle of supply voltage following anode-cathode conduction of said third electron discharge device.

MAURICE E. BIVENS.

REFERENCES CITED

The following references are of record in the file of this patent:

UNITED STATES PATENTS

| Number | Name | Date |
|---|---|---|
| 1,934,230 | Jonas | Nov. 7, 1933 |
| 1,980,461 | Widmer | Nov. 13, 1934 |
| 2,179,284 | Diamond | Nov. 7, 1939 |
| 2,356,859 | Leathers et al. | Aug. 29, 1944 |
| 2,431,083 | Sciaky | Nov. 18, 1947 |
| 2,474,867 | Sciaky | July 5, 1949 |

FOREIGN PATENTS

| Number | Country | Date |
|---|---|---|
| 441,826 | Great Britain | Oct. 15, 1934 |